(12) United States Patent
Fujii (10) Patent No.: US 10,420,180 B2
(45) Date of Patent: Sep. 17, 2019

(54) LIGHTING APPARATUS AND LIGHTING SYSTEM

(71) Applicant: PANASONIC INTELLECTUAL PROPERTY MANAGEMENT CO., LTD., Osaka (JP)

(72) Inventor: Shumpei Fujii, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/922,457

(22) Filed: Mar. 15, 2018

(65) Prior Publication Data

US 2018/0288844 A1 Oct. 4, 2018

(30) Foreign Application Priority Data

Mar. 29, 2017 (JP) .................. 2017-066376

(51) Int. Cl.

| | |
|---|---|
| H05B 33/08 | (2006.01) |
| F21V 8/00 | (2006.01) |
| F21V 33/00 | (2006.01) |
| H05B 37/02 | (2006.01) |
| F21V 5/00 | (2018.01) |
| F21V 9/02 | (2018.01) |
| F21V 11/06 | (2006.01) |
| F21V 13/02 | (2006.01) |
| G02B 6/00 | (2006.01) |
| F21Y 105/16 | (2016.01) |

(52) U.S. Cl.
CPC ......... *H05B 33/0845* (2013.01); *F21V 5/005* (2013.01); *F21V 9/02* (2013.01); *F21V 11/06* (2013.01); *F21V 13/02* (2013.01); *F21V 33/0016* (2013.01); *G02B 6/00* (2013.01); *G02B 6/0051* (2013.01); *H05B 33/086* (2013.01); *H05B 33/0857* (2013.01); *H05B 37/0272* (2013.01); *F21Y 2105/16* (2016.08)

(58) Field of Classification Search
CPC ............ F21V 33/0016; H05B 33/0845; H05B 33/0857; G02B 6/0051
USPC .............. 362/125, 217.11, 217.15, 246, 290; 353/28
See application file for complete search history.

(56) References Cited

U.S. PATENT DOCUMENTS

| | | | |
|---|---|---|---|
| 5,426,879 A * | 6/1995 | Hecker .................. | G09F 13/08 362/812 |
| 7,384,204 B2 * | 6/2008 | Uematsu ................. | G03B 9/50 396/358 |
| 2008/0192456 A1 | 8/2008 | Van Tertholen et al. | |

(Continued)

FOREIGN PATENT DOCUMENTS

| | | |
|---|---|---|
| JP | 2008-545905 A | 12/2008 |
| JP | 2012-047019 A | 3/2012 |

(Continued)

*Primary Examiner* — William C. Dowling
(74) *Attorney, Agent, or Firm* — McDermott Will & Emery LLP (57) ABSTRACT

A lighting apparatus includes: a light source; a light-transmissive diffuser panel disposed to receive light emitted from the light source; a frame having an opening through which light passes; and a light blocker that blocks the light emitted from the light source. The diffuser panel is fixed to the frame to cover the opening. The light blocker blocks a portion of the light passing through the opening.

14 Claims, 7 Drawing Sheets

(56) References Cited

U.S. PATENT DOCUMENTS

| | | |
|---|---|---|
| 2008/0253106 A1 | 10/2008 | Sempel et al. |
| 2009/0273302 A1 | 11/2009 | Staats et al. |
| 2014/0133125 A1 | 5/2014 | Di Trapani et al. |
| 2016/0281960 A1 | 9/2016 | Di Trapani et al. |
| 2017/0051893 A1 | 2/2017 | Di Trapani |

FOREIGN PATENT DOCUMENTS

| | | |
|---|---|---|
| JP | 2015-207554 A | 11/2015 |
| JP | 2016-514340 A | 5/2016 |

\* cited by examiner

LIGHTING APPARATUS AND LIGHTING SYSTEM

CROSS REFERENCE TO RELATED APPLICATION

This application claims the benefit of priority of Japanese Patent Application Number 2017-066376 filed on Mar. 29, 2017, the entire content of which is hereby incorporated by reference.

BACKGROUND

1. Technical Field

The present disclosure relates to a lighting apparatus and a lighting system using the lighting apparatuses, and particularly relates to a lighting apparatus and a lighting system which are capable of producing a lighting environment close to nature.

2. Description of the Related Art

Conventionally, a lighting system using a lighting apparatus including a first light source for emitting visible light and a diffuser panel for diffusing light has been disclosed (see, for example, Japanese Unexamined Patent Application Publication (Translation of PCT Application) No. 2016-514340). The lighting system is capable of performing illumination which mimics illumination by natural light.

SUMMARY

However, even if the lighting system is installed in a part of a building, such as a wall and a ceiling, the lighting system differs in configuration from a real window. Accordingly, it is impossible to reproduce an environment closer to a living environment.

In view of the above, an object of the present disclosure is to provide a lighting apparatus and a lighting system which are capable of producing a lighting environment which mimics a lighting environment by natural light coming through a window or windows.

In order to achieve the above-described object, a lighting apparatus according to an aspect of the present disclosure includes: a light source; a diffuser panel disposed to receive light emitted from the light source, the diffuser panel being light transmissive; a frame having an opening through which light passes; and a light blocker that blocks the light emitted from the light source, in which the diffuser panel is fixed to the frame to cover the opening, and the light blocker blocks a portion of the light passing through the opening.

Moreover, in order to achieve the above-described object, a lighting system according to an aspect of the present disclosure includes a plurality of the lighting apparatuses.

According to the present disclosure, it is possible to produce a lighting environment which mimics a lighting environment by natural light coming through a window or windows.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure will be described with reference to the drawings. It should be noted that the subsequently-described embodiments each show a specific example of the present disclosure. Therefore, numerical values, shapes, materials, structural components, the arrangement and connection of the structural components, etc. shown in the following embodiments are mere examples, and are not intended to limit the scope of the present disclosure. Furthermore, among the structural components in the following embodiments, components not recited in the independent claim which indicates the broadest concept of the present disclosure are described as arbitrary structural components.

Moreover, "substantially" and "approximately" mean, for example in the case of "substantially the same", not only exactly the same, but what would be recognized as essentially the same as well.

In addition, each of the diagrams is a schematic diagram and thus is not necessarily strictly illustrated. In each of the diagrams, substantially the same structural components are assigned with the same reference signs, and redundant descriptions will be omitted or simplified.

The following describes lighting apparatuses according to embodiments of the present disclosure.

Embodiment 1

(Configuration)

First, the configuration of lighting apparatus 1 according to the present embodiment will be described with reference to FIG. 1 to FIG. 4.

Figure 1:
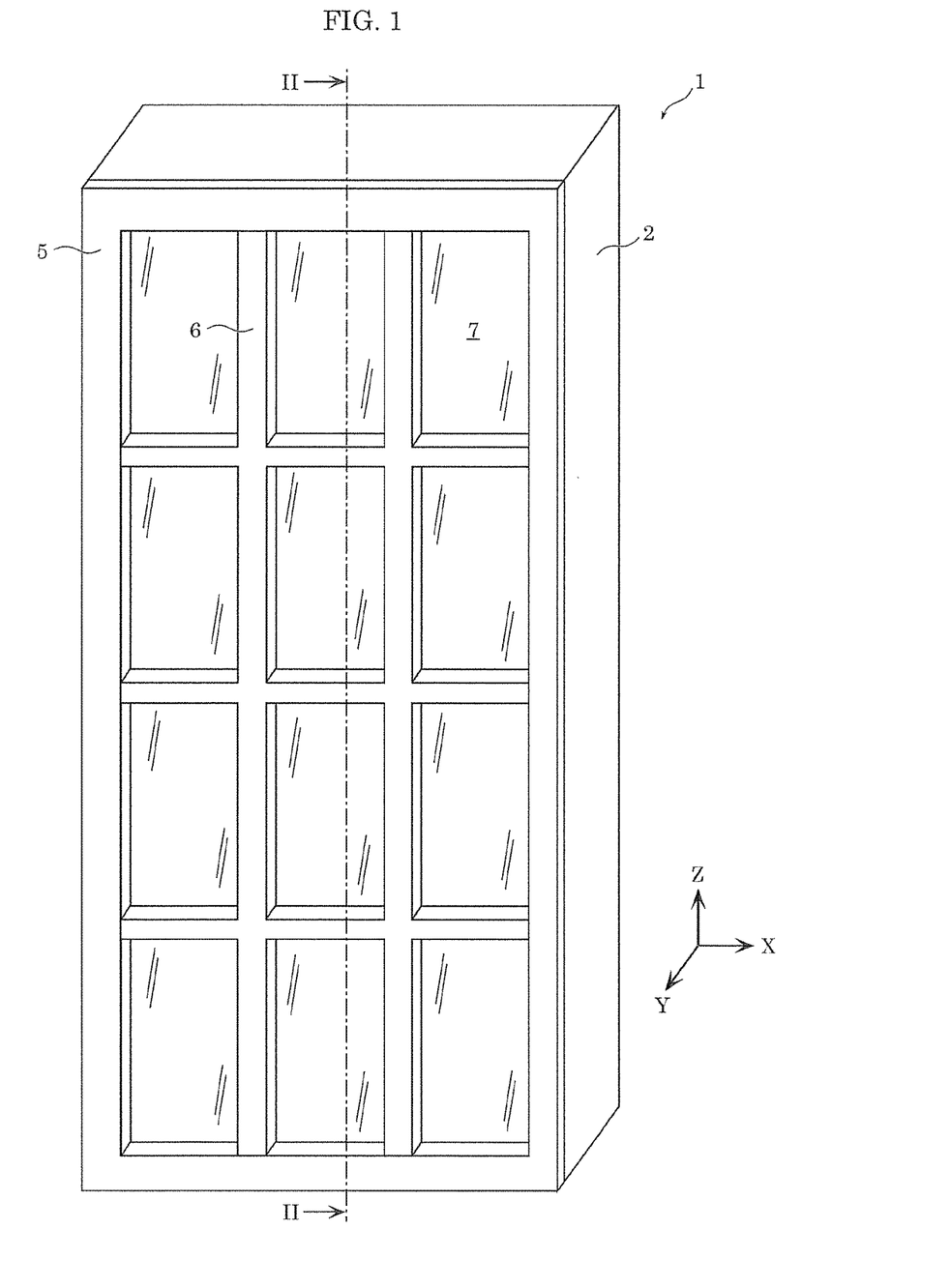
FIG. 1 is a perspective view illustrating a lighting apparatus according to Embodiment 1.
Figure 2:
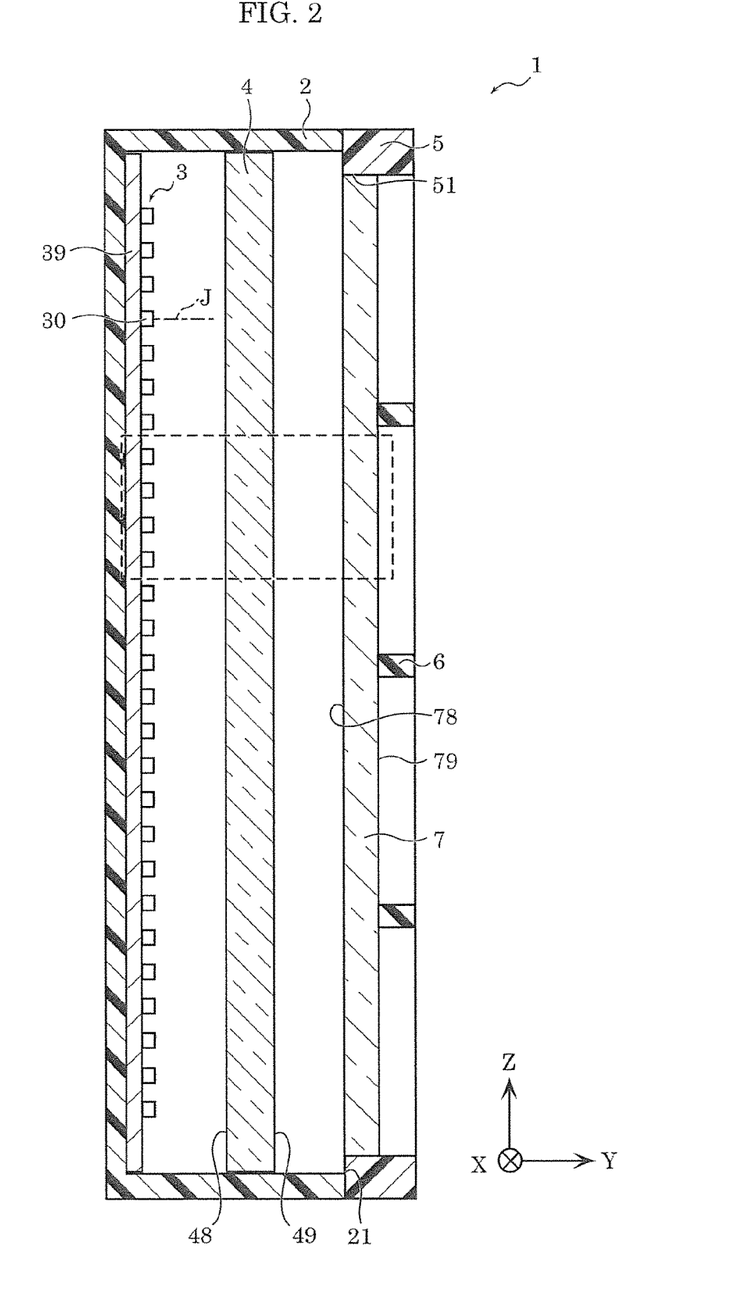
FIG. 2 is a cross-sectional view illustrating the lighting apparatus according to Embodiment 1, taken at line II-II of FIG. 1.
Figure 3:
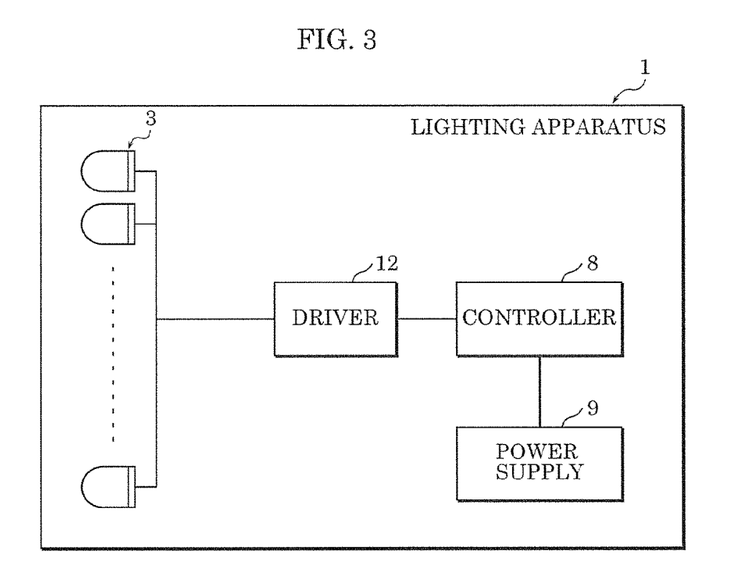
FIG. 3 is a block diagram illustrating the lighting apparatus according to Embodiment 1.
Figure 4:
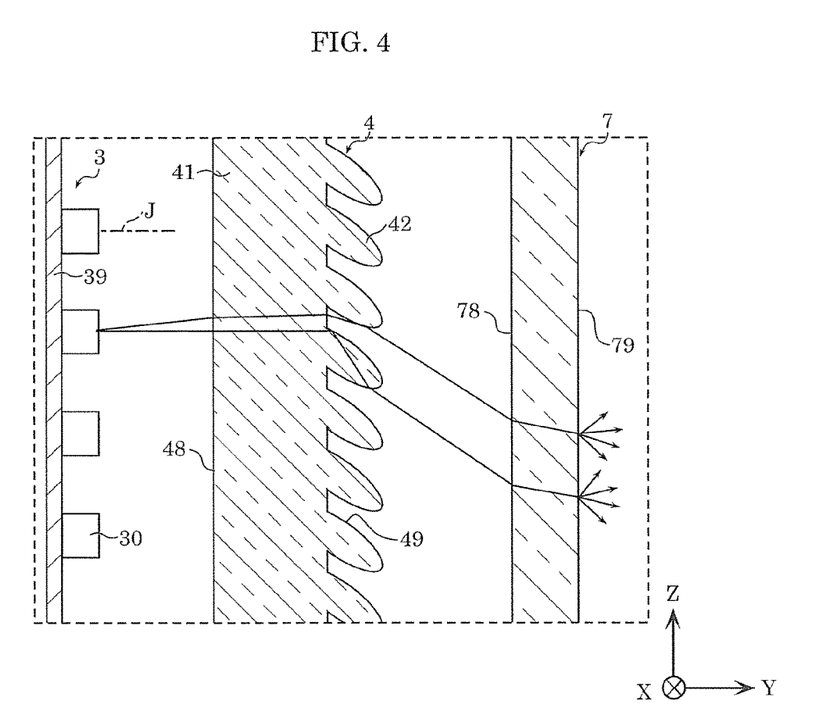
FIG. 4 is an enlarged cross-sectional view illustrating a portion of a light direction control panel of the lighting apparatus according to Embodiment 1.

FIG. 1 is a perspective view illustrating lighting apparatus 1 according to Embodiment 1. FIG. 2 is a cross-sectional view illustrating lighting apparatus 1 according to Embodiment 1, taken at line II-II of FIG. 1. FIG. 3 is a block diagram illustrating lighting apparatus 1 according to Embodiment 1. FIG. 4 is an enlarged cross-sectional view illustrating a portion of light direction control panel 4 of lighting apparatus 1 according to Embodiment 1. FIG. 4 corresponds to a dashed line square shown in FIG. 2.

In FIG. 1, the longitudinal direction of lighting apparatus 1 is defined as z-axis, the latitudinal direction of lighting apparatus 1 is defined as x-axis, and a direction perpendicular to the z-axis and the x-axis is defined as y-axis. It should be noted that the directions illustrated in FIG. 2 and subsequent figures correspond to those illustrated in FIG. 1.

As illustrated in FIG. 1, lighting apparatus 1 is an apparatus capable of producing a lighting environment close to nature by mimicking nature light coming through a window. Lighting apparatus 1 is an ambient lighting apparatus which is provided in a part of a building such as a ceiling and a wall of a facility, for example. In particular, lighting apparatus 1 may be installed in a facility where it is difficult to let in natural light. Lighting apparatus 1 may be recessed into a part of a building, for example. In the present embodiment, it is assumed that lighting apparatus 1 is installed in a wall.

As illustrated in FIG. 1 to FIG. 3, lighting apparatus 1 includes case 2, light emitting module 3, light direction control panel 4, frame 5, light blocker 6, diffuser panel 7, controller 8, power supply 9, and driver 12.

Case 2 is a thin box and has a substantially rectangular shape in a plan view. It should be noted that the shape of case 2 is not limited to a rectangular shape, and a circular shape, a multangular shape, and a semicircle shape may be employed. The shape of case 2 is not particularly limited.

Case 2 houses at least diffuser panel 7, light direction control panel 4, and light emitting module 3. Case 2 is provided with container opening 21 which is open on the y-axis plus side. Case 2 may also house controller 8 and power supply 9. Controller 8 and power supply 9 may be provided outside case 2.

Light emitting module 3 includes two or more light sources 30, and wiring board 39 on which light sources 30 are mounted. In the present embodiment, light emitting module 3 is disposed on the bottom of case 2 at an orientation in which light emitted from light source 30 is directed toward container opening 21 of case 2. In other words, primary light direction J of light source 30 passes through container opening 21.

Each of light sources 30 is mounted on wiring board 39 such that primary light direction J is substantially parallel to the y-axis. In the present embodiment, light sources 30 are mounted on wiring board 39 in a matrix.

Light source 30 includes at least one of a white light source which emits white light and a blue light source which emits blue light. In the present embodiment, light source 30 includes two or more white light sources and two or more blue light sources.

The white light source emits white light. The white light is not strictly white color. Typically, the white light refers to light perceived as white color. The blue light source emits blue light. The blue light has a wavelength in the range of 435 nm to 495 nm. The blue light is not strictly blue color, and typically refers to light perceived as blue color.

The white light sources and the blue light sources may be, as they are called, surface mount device (SMD) light emitting diode (LED) elements. Specifically, the SMD LED element is a packaged LED element formed by mounting an LED chip, light emitting element, in a cavity molded by resin, and filling the cavity with a phosphor-containing resin. The white light sources and the blue light sources are turned on, dimmed, and turned off by controlling driver 12 through controller 8. Moreover, the white light sources and the blue light sources receive dimming control and toning control by controlling driver 12 through controller 8.

Light direction control panel 4 is a light-transmissive component capable of transmitting light emitted from light source 30 and causing the light to emerge in parallel rays. Light direction control panel 4 is a composite component including particles in the range of 0.1 µm to 50 µm dispersed in a light-transmissive optical base material. Light direction control panel 4 includes a resin material such as acrylic and poly ethylene terephthalate (PET), or glass, as a base material.

Light direction control panel 4 is disposed between light emitting module 3 and diffuser panel 7 and facing diffuser panel 7 and light emitting module 3. Light direction control panel 4 is provided in case 2 to be substantially perpendicular to primary light direction J of each of light sources 30.

As illustrated in FIG. 4, light direction control panel 4 includes base 41 and two or more micro louvers 42.

Base 41 is a plate component included in light direction control panel 4. The surface of base 41 facing light sources 30 is referred to as first incident surface 48. First incident surface 48 is a surface on which light emitted from light sources 30 is incident. First incident surface 48 is substantially perpendicular to primary light direction J of each of light sources 30.

Light direction control panel 4 has first light exit surface 49 on a side opposite to first incident surface 48. First light exit surface 49 is a surface from which light transmitted through light direction control panel 4 emerges, and consists of the surfaces of micro louvers 42 and the surface of base 41 between adjacent micro louvers 42.

Micro louvers 42 are formed on a side opposite to first incident surface 48. Micro louvers 42 are included in light direction control panel 4. Each of micro louvers 42 is a louver elongated along the x-axis and projects from base 41 in substantially the same direction. Each of micro louvers 42 projects to a direction crossing primary light direction J of light source 30. Micro louvers 42 form a stripe pattern of protrusions and recesses. Micro louvers 42 are formed on base 41 at regular intervals and project in substantially the same direction. The pitch distance between two adjacent micro louvers 42 is several micro meters.

It should be noted that light direction control panel 4 including base 41 and micro louvers 42 is an example, and is not limited to this configuration. For example, light direction control panel 4 may be a light guide panel capable of controlling a direction of light such that light emerges in parallel rays and travels in a predetermined direction. This light guide panel has a micron-scale fine pattern formed on a resin sheet using a mastering technique, for example. Alternatively, the light guide panel may be implemented by applying a sheet having such a fine pattern to a light-transmissive base material. It should be noted that a known component may be employed as light direction control panel 4 as long as light is allowed to emerge in parallel rays.

As illustrated in FIG. 1 to FIG. 3, diffuser panel 7 is a rectangular plate component in a plan view. Diffuser panel 7 is fixed to frame 5 to cover frame opening 51. In the present embodiment, diffuser panel 7 is disposed to receive light emitted from light source 30 and faces first light exit surface 49 of light direction control panel 4. Frame opening 51 is an example of an opening.

Diffuser panel 7 is light transmissive and light diffusive. Diffuser panel 7 has second incident surface 78 and second light exit surface 79. Second incident surface 78 is a surface on which the light from light direction control panel 4 is incident, and which faces first light exit surface 49 of light direction control panel 4. Second light exit surface 79 is a surface from which the light emerges after the light is incident on second incident surface 78 and transmits through diffuser panel 7. Second light exit surface 79 is an example of a light exit surface.

Diffuser panel 7 scatters blue light more than light other than the blue light. As an example of diffuser panel 7, a Rayleigh diffuser panel which causes Rayleigh scattering of incident light may be employed. The Rayleigh diffuser panel is a component which includes resin such as light-transmissive acrylic as a base material, and a nanocomposite material dispersed therein. The nanocomposite material is oxidized metal such as titanium oxide, zinc oxide, zirconia oxide, etc. When a particle size of the nanocomposite material is sufficiently smaller than a wavelength of light, Rayleigh scattering of light incident on diffuser panel 7 occurs.

Diffuser panel 7 diffuses a portion of light incident on second incident surface 78 and causes bluish diffuse light to emerge from second light exit surface 79 of diffuser panel 7. With this, it is possible to cause bluish diffuse light mimicking natural light to emerge.

Diffuser panel 7 may be semi-transparent at a predetermined cloud level in which the inner surface texture of case 2 cannot be visually recognized. Here, the cloud level denotes an amount determined by (diffuse transmittance/total transmittance)×100. The diffuse transmittance denotes a ratio of an amount of light having an emergent angle more than a predetermined emergent angle among light from diffuser panel 7, to total amount of parallel light incident on diffuser panel 7.

Diffuser panel 7 includes a resin material such as acrylic, poly ethylene terephthalate (PET), or glass, as a base material. Diffuser panel 7 may be an opaque white diffuser panel in which light diffusion material is dispersed. Such a diffuser panel may be manufactured by resin-molding, into a predetermined shape, a light-transmissive resin material to which light diffuse material is mixed. As the light diffuse material, light reflective fine particles such as silica particles may be employed.

Moreover, diffuser panel 7 may be configured by, not dispersing the light diffusion material inside, but forming, on the surface of a transparent panel, an opaque white light diffusion film including the light diffuse material, etc.

Moreover, diffuser panel 7 may be configured to be light diffusive by, not using the light diffuse material, but applying light diffusion treatment. For example, light-diffusive diffuser panel 7 may be configured by applying surface finish such as emboss process to form fine unevenness on the surface of the transparent panel, or printing a dot pattern on the surface of the transparent panel. In this case, in diffuser panel 7, the fine unevenness may be in size that the texture cannot be visually recognized. It should be noted that, even when light diffusion treatment is applied, diffuser panel 7 may include the light diffuse material in order to enhance the light diffusivity.

Frame 5 is an annular component having a substantially rectangular shape in a plan view. Frame 5 has a shape mimicking a window frame for use in a normal window. Frame 5 is provided on an end edge of case 2 on the y-axis plus side, to cover container opening 21 of case 2. In other words, frame 5 is provided on the end edge of case 2 on the y-axis plus side so as to align with an outer periphery of case 2 in a plan view. It should be noted that the shape of frame 5 is not limited to a rectangular shape, and a circular shape, a multangular shape, and a semicircle shape may be employed. The shape of frame 5 is not particularly limited.

Frame 5 has substantially rectangular frame opening 51 (an example of an opening) in the central portion. Frame opening 51 causes light from light direction control panel 4 to pass therethrough. Frame 5 rigidly hold diffuser panel 7 to cover frame opening 51. In other words, diffuser panel 7 is fitted into frame opening 51 of frame 5.

Light blocker 6 blocks a portion of light passing through frame opening 51. Light blocker 6 is provided on frame 5 so as to divide frame opening 51 into two or more sections In the present embodiment, light blocker 6 is provided on second light exit surface 79, and disposed on second light exit surface 79 of diffuser panel 7 to project from second light exit surface 79. Specifically, light blocker 6 is a light shield which forms a grid and has a shape mimicking window mullions for use in a normal window. Light blocker 6 is fixed to frame 5. It should be noted that light blocker 6 may be integrally formed with second light exit surface 79 of diffuser panel 7.

As illustrated in FIG. 3, controller 8 controls operations of light emitting module 3 such as turning on, turning off, dimming, and toning, based on a control signal received via a remote control. The operations such as dimming and toning are controlled by adjusting emission color or color temperature of light to be emitted by light emitting module 3. For example, controller 8 performs dimming control on white light sources and blue light sources by controlling driver 12 to increase the brightness of white light sources and decrease the brightness of blue light sources. Controller 8 includes a circuit for controlling light emitting module 3, and others. Controller 8 implements the above-described operations using a microcomputer, processor, etc., or a dedicated circuit, which controls a value of a current supplied to light emitting module 3 according to an input signal.

Power supply 9 includes a power supply circuit which generates power for causing light emitting module 3 to emit light. Power supply 9 rectifies, smoothes, steps down, etc., power supplied from a power system, for example, to convert the power into DC power at a predetermined level, and supplies the DC power to light emitting module 3. Power supply 9 is electrically connected via a control line or a power line of the power system.

Driver 12 is controlled by controller 8 to switch on and off power supply to light emitting module 3. For example, when receiving an instruction for turning on via an operation interface such as a remote control, controller 8 causes driver 12 to supply power to light emitting module 3 to turn on the white light sources and the blue light sources of light emitting module 3. Moreover, when receiving an instruction for turning off via the operation interface, controller 8 causes driver 12 to stop supplying power to light emitting module 3 to turn off the white light sources and the blue light sources of light emitting module 3.

As illustrated in FIG. 4, in lighting apparatus 1, light emitted from light source 30 is incident on first incident surface 48 of light direction control panel 4, and transmits through light direction control panel 4, for example. In this transmission, a portion of light transmitting though light direction control panel 4 is internally reflected on the surface of micro louver 42 and then emerges from the ridge side of micro louver 42. In the present embodiment, micro louver 42 is inclined toward the z-axis minus side with respect to the y-axis, and thus the light from first light exit surface 49 travels toward the z-axis minus side with respect to the y-axis.

Moreover, another portion of light transmitting though light direction control panel 4 emerges from first light exit surface 49 between two adjacent micro louvers 42, and then is externally reflected on the surface of micro louver 42 to travel toward the z-axis minus side with respect to the y-axis. In this manner, light direction control panel 4 allows light to emerge in parallel rays.

The light from light direction control panel 4 is incident on second incident surface 78 of diffuser panel 7, transmits through diffuser panel 7, and emerges from second light exit surface 79. Thus, lighting apparatus 1 emits collimated and diffused light.

Here, in order to be perceived by a person as illumination by natural light, there would be necessary collimated light which has a low color temperature and can produce distinct shadow of an illuminated object, and diffuse light which has a color temperature higher than the collimated light and is bluish light from the sky.

In lighting apparatus 1, light transmitted through light direction control panel 4 becomes the collimated light, and emerges from first light exit surface 49 of light direction control panel 4. Moreover, a portion of light from light direction control panel 4 is diffused in diffuser panel 7 such that more blue light diffuses, and thus diffuse light which is more bluish than the collimated light emerges from second light exit surface 79 of diffuser panel 7. In other words, the diffuse light emitted from lighting apparatus 1 mimics natural light. Accordingly, a user feels as if the light emitted from lighting apparatus 1 (the collimated and diffused light) was natural light. In lighting apparatus 1, it is possible to produce light which mimics natural light coming through a window.

(Advantageous Effect)

Next, the following describes an advantageous effect of lighting apparatus 1 according to the present embodiment.

As described above, lighting apparatus 1 according to the present embodiment includes: light source 30; diffuser panel 7 disposed to receive light emitted from light source 30, the diffuser panel being light transmissive; frame 5 having frame opening 51 through which light passes; and light blocker 6 that blocks the light emitted from light source 30. Diffuser panel 7 is fixed to frame 5 to cover frame opening 51, and light blocker 6 blocks a portion of the light passing through frame opening 51.

In this manner, while light emerges from second light exit surface 79 of diffuser panel 7, a portion of light passing through frame opening 51 is blocked. Thus, frame 5, light blocker 6, and the light passing through frame opening 51 cause a user to feel as if he/she looked at a window frame.

Moreover, diffuse light emerges from second light exit surface 79 of diffuser panel 7, and thus the user is given a sense of natural light coming through a window.

Accordingly, it is possible to produce a lighting environment which mimics a lighting environment by natural light coming through a window.

Moreover, lighting apparatus 1 according to the present embodiment further includes light direction control panel 4 disposed facing diffuser panel 7 and between light source 30 and diffuser panel 7, light direction control panel 4 transmitting the light emitted from light source 30 and causing the light to emerge in parallel rays.

In this manner, light direction control panel 4 disposed facing diffuser panel 7 and between light source 30 and diffuser panel 7 transmits light emitted from light source 30 and causes the light to emerge in parallel rays. Thus, due to mixing of the collimated light and diffuse light, it becomes easy to be perceived by a person as illumination by natural light. Accordingly, lighting apparatus 1 can give a user a more realistic sense of natural light.

Moreover, in lighting apparatus 1 according to the present embodiment, light direction control panel 4 includes base 41 and two or more micro louvers 42 formed on base 41. Each of micro louvers 42 projects from base 41 in substantially a same direction.

In this manner, micro louvers 42 project from base 41 in substantially the same direction, and thus lighting apparatus 1 allows the emitted light to travel in parallel rays.

Moreover, in lighting apparatus 1 according to the present embodiment, each of micro louvers 42 projects in a direction crossing primary light direction J of light source 30.

With this configuration, light direction control panel 4 can cause the light from light source 30 to travel in a direction crossing primary light direction J. Accordingly, it is possible to perform rendering as if the light was coming through a window, and thus it becomes easy to be perceived by a person as illumination by natural light.

Moreover, in lighting apparatus 1 according to the present embodiment, diffuser panel 7 scatters blue light more than light other than the blue light.

With this configuration, blue light more than light other than the blue light is scattered in diffuser panel 7, and thus bluish diffuse light more than the light other than the blue light emerges from second light exit surface 79 of diffuser panel 7. Accordingly, lighting apparatus 1 allows a user to easily perceive the lighting environment as a lighting environment by natural light coming through a window.

Moreover, in lighting apparatus 1 according to the present embodiment, light blocker 6 is disposed on second light exit surface 79 of diffuser panel 7 to project from second light exit surface 79 of diffuser panel 7. Moreover, in lighting apparatus 1 according to the present embodiment, light blocker 6 is provided on frame 5 to divide frame opening 51 into two or more sections. Moreover, in lighting apparatus 1 according to the present embodiment, light blocker 6 is formed in a grid.

In this manner, light blocker 6 projects from second light exit surface 79, and thus a user mainly focuses his/her eyes on light blocker 6. In this case, when the focus is put on the top of light blocker 6, diffuser panel 7 located behind light blocker 6 is slightly blurred. Accordingly, it is possible to produce a lighting environment which more realistically mimics a lighting environment by natural light coming through a window.

Moreover, light blocker 6 is formed in a grid projecting from second light exit surface 79, and thus frame 5 and light blocker 6 allows a person to feel as if they were a real window.

Moreover, lighting apparatus 1 according to the present embodiment further includes: two or more light sources 30; and light emitting module 3 including light sources 30 and wiring board 39 on which light sources 30 are mounted in a matrix. Light direction control panel 4 and light blocker 6 are disposed on light emission sides of light sources 30.

As described above, lighting apparatus 1 according to the present embodiment includes: light source 30; diffuser panel 7 that causes light emitted from light source 30 to emerge as diffuse light, diffuser panel 7 being light transmissive; frame 5 having frame opening 51 through which light passes; and light blocker 6 that blocks light emitted from light source 30. Diffuser panel 7 is fixed to frame 5 to cover frame opening 51. Light blocker 6 blocks a portion of the light passing through frame opening 51 to divide frame opening 51 into two or more sections.

VARIATION OF EMBODIMENT 1

(Configuration)

The configuration of lighting apparatus 1 according to a variation of Embodiment 1 will be described with reference to FIG. 5.

Figure 5:
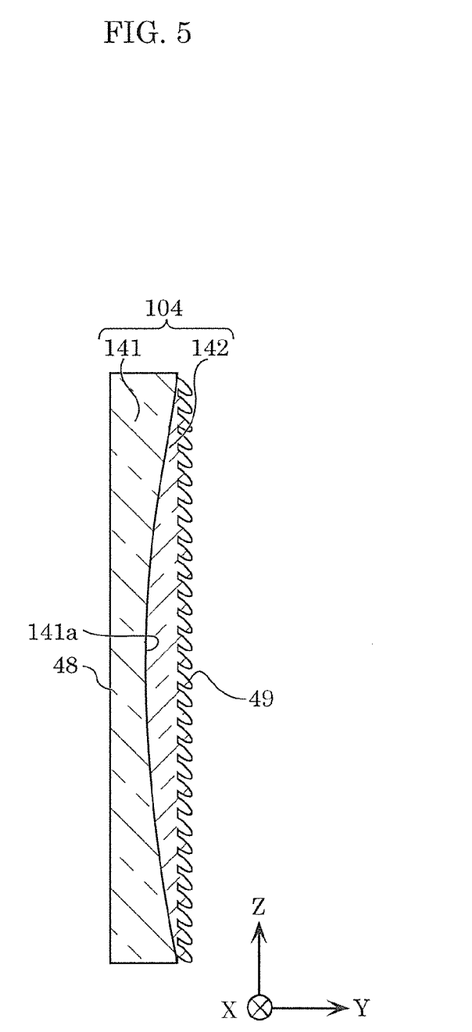
FIG. 5 is a cross-sectional view illustrating a light direction control panel of a lighting apparatus according to a variation of Embodiment 1.

FIG. 5 is a cross-sectional view illustrating light direction control panel 104 of lighting apparatus 1 according to the variation of Embodiment 1.

The present variation differs from Embodiment 1 in that the refractive index of light direction control panel 104 is different between a central portion and a peripheral portion. Moreover, unless otherwise stated, lighting apparatus 1 according to the present variation is the same as lighting apparatus 1 according to Embodiment 1. Substantially the same structural components are assigned with the same reference signs, and redundant descriptions will be omitted or simplified.

As illustrated in FIG. 5, light direction control panel 104 is a Gradient-index (GRIN) lens which includes layers each having a different refractive index and has a refraction gradient inside. Light direction control panel 104 functions as a lens due to the refraction gradient.

Light direction control panel 104 includes first light transmitting portion 141 and second light transmitting portion 142 that is layered on the light exit side of first light transmitting portion 141 and has a refractive index lower than a refractive index of first light transmitting portion 141.

First light transmitting portion 141 is disposed on the y-axis plus side which is the first incident surface 48 side of light direction control panel 104. First light transmitting portion 141 becomes thicker with an increase in a distance from the central portion. More specifically, in a sectional view of light direction control panel 104, first light transmitting portion 141 has a concave from the y-axis plus side to the y-axis minus side. Concave portion 141a has a curved arc shape.

Second light transmitting portion 142 is layered on the y-axis plus side of first light transmitting portion 141. A light guide panel of second light transmitting portion 142 is thicker in a central portion of light direction control panel 104 than in a peripheral portion of light direction control panel 104. In the present variation, second light transmitting portion 142 becomes thinner with an increase in a distance from the central portion. In other words, second light transmitting portion 142 is layered on the y-axis plus side of first light transmitting portion 141 so as to fill concave portion 141a of first light transmitting portion 141.

In this manner, the thickness is varied in first light transmitting portion 141 and second light transmitting portion 142, and thus light direction control panel 104 has a predetermined refraction gradient. It should be noted that light direction control panel 104 may include a light-transmissive resin material and a nanocomposite material dispersed therein in a concentration gradient.

In lighting apparatus 1 according to the present variation, light direction control panel 104 includes first light transmitting portion 141 and second light transmitting portion 142 that is layered on the light exit side of first light transmitting portion 141 and has a refractive index lower than a refractive index of first light transmitting portion 141. Moreover, second light transmitting portion 142 is thicker in the central portion of light direction control panel 104 than in the peripheral portion of light direction control panel 104.

In this manner, first light transmitting portion 141 is formed to be thin in the central portion of light direction control panel 104, and second light transmitting portion 142 having the refractive index lower than that of first light transmitting portion 141 is formed to be thin in the peripheral portion of light direction control panel 104, and thus it is possible to cause collimated light or convergent light to emerge from light direction control panel 104. Accordingly, the shadows of frame 5 and light blocker 6 are made and the light passing through frame opening 51 irradiates an illuminated surface. As a result, the contrast of the illuminated surface becomes distinct, and thus it is possible to produce a lighting environment which more realistically mimics a lighting environment by natural light coming through a window.

Moreover, in lighting apparatus 1 according to the present variation, second light transmitting portion 142 is layered on the central portion of first light transmitting portion 141.

The present variation produces other advantageous effects in the same manner as Embodiment 1 etc.

Embodiment 2

(Configuration)

The configuration of lighting apparatus 200 according to Embodiment 2 will be described with reference to FIG. 6.

Figure 6:
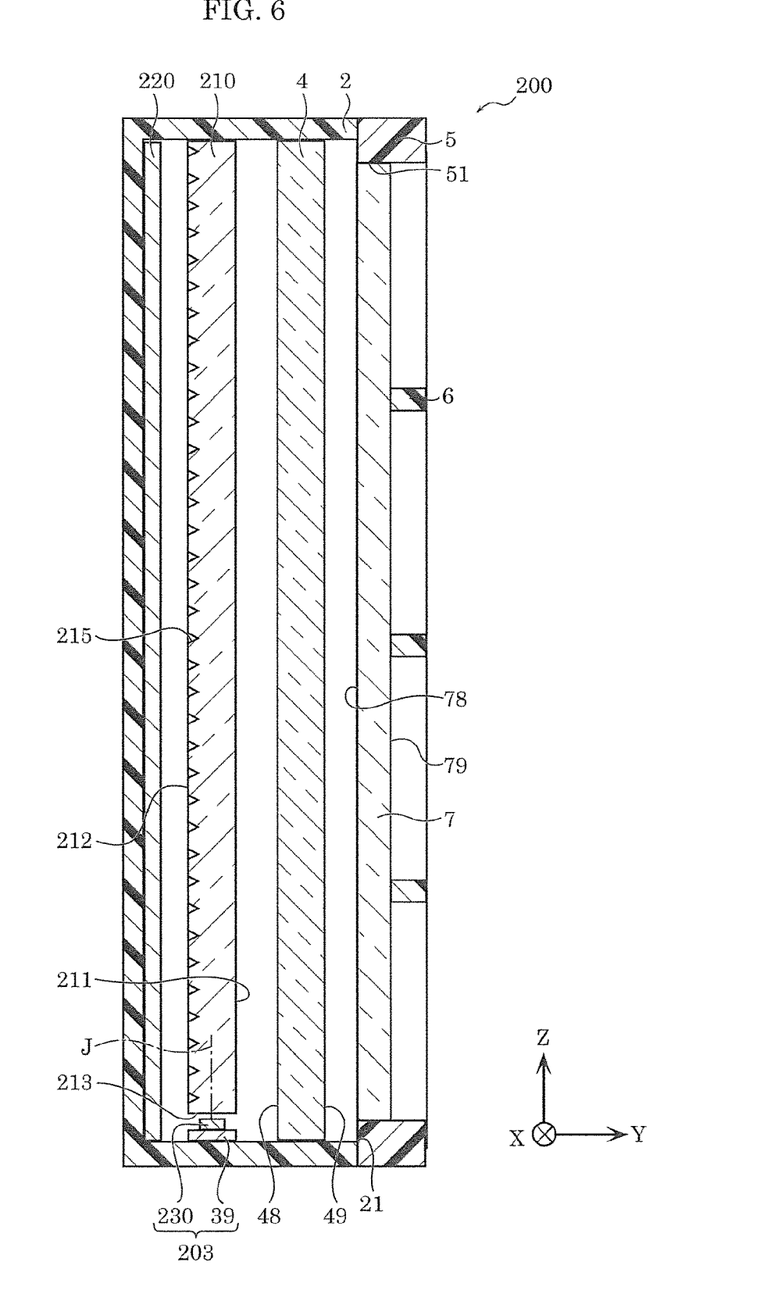
FIG. 6 is a cross-sectional view illustrating a lighting apparatus according to Embodiment 2.

FIG. 6 is a cross-sectional view illustrating lighting apparatus 200 according to Embodiment 2.

The present embodiment differs from Embodiment 1 in that light guide panel 210 and reflector 220 are further employed and light source 230 is disposed to cause light to enter through third incident surface 213 of light guide panel 210. Moreover, unless otherwise stated, lighting apparatus 200 according to the present embodiment is the same as lighting apparatus 1 according to Embodiment 1. Substantially the same structural components are assigned with the same reference signs, and redundant descriptions will be omitted or simplified.

As illustrated in FIG. 6, lighting apparatus 200 includes light guide panel 210 and reflector 220 besides case 2, light emitting module 203, light direction control panel 4, frame 205, diffuser panel 7, controller 8, power supply 9, and driver 12.

Case 2 houses light guide panel 210 and reflector 220 beside light emitting module 203, light direction control panel 4, and diffuser panel 7.

Light guide panel 210 has a rectangular plate-like shape and is an optical component for guiding light emitted from light source 230. Light guide panel 210 is formed from a light-transmissive resin material such as acrylic, polycarbonate, and glass, but not limited to this. Light guide panel 210 may be formed from any other light-transmissive materials. It should be noted that the shape of light guide panel 210 is not limited to rectangular. A circular shape, a multangular shape, and any other shapes may be employed.

Light guide panel 210 is fixed in case 2 so as to be substantially parallel to a plane defined by the x-axis and the z-axis. Light guide panel 210 is disposed facing first incident surface 48 of light direction control panel 4, on the y-axis minus side of light direction control panel 4. Light guide panel 210 includes front surface 211, back surface 212, and third incident surface 213. Third incident surface 213 is one example of an edge surface.

Third incident surface 213 is a surface on which light from each of light sources 230 is incident, and is a substantially even plane. Third incident surface 213 is disposed substantially perpendicular to primary light direction J of light source 230 such that the light emitted from light source 230 is incident on third incident surface 213. Third incident surface 213 crosses front surface 211 and back surface 212.

In other words, light guide panel 210 is disposed on a light emission side of light source 230. It should be noted that third incident surface 213 is a portion of a side surface of light guide panel 210. The light emission side of light source 230 refers to the z-axis plus side of light source 230.

Front surface 211 is a surface of light guide panel 210 on the y-axis plus side, which is substantially perpendicular to third incident surface 213, and is a substantially even plane.

Back surface 212 is a surface which faces reflector 220 and is opposite to front surface 211. Back surface 212 is a surface of light guide panel 210 on the y-axis minus side, which is substantially perpendicular to third incident surface 213, and is a substantially even plane. Back surface 212 may include conical prisms 215 which are recessed toward front surface 211. In this case, prisms 215 may reflect light guided in light guide panel 210.

In the present embodiment, wiring board 39 of light emitting module 203 is elongated, and light sources 230 are mounted on wiring board 39 in a line at regular intervals. It should be noted that light sources 230 may be arranged on wiring board 39 in two or more lines.

Light sources 230 are disposed to cause light to enter from third incident surface 213 of light guide panel 210. In other words, light sources 230 are disposed at regular intervals to emit light along the z-axis plus direction. Specifically, light sources 230 are disposed facing third incident surface 213 such that primary light direction J is perpendicular to third incident surface 213 of light guide panel 210.

Moreover, light sources 230 and light guide panel 210 are spaced to prevent them from being in contact with each other. This is because to prevent light guide panel 210 from being damaged by the heat of light source 230 conducted through light guide panel 210.

Reflector 220 is a flat component having a rectangular shape, and is a mirror which reflects incident light. Reflector 220 is disposed on the bottom surface of case 2 and facing back surface 212 of light guide panel 210. Specifically, reflector 220 is disposed facing back surface 212 of light guide panel 210 so as to be substantially parallel to a plane defined by the x-axis and the z-axis. Reflector 220 reflects light from back surface 212 of light guide panel 210 and light entering directly from light source 230. It should be noted that reflector 220 only needs to reflect incident light, and may be, for example, a plate which is black in color.

In lighting apparatus 200, the light emitted from light sources 230 is incident on third incident surface 213 of light guide panel 210, and a portion of light guided inside light guide panel 210 is reflected at prisms 215 of back surface 212. The light reflected at prisms 215 emerges from front surface 211 of light guide panel 210. Then, the light transmits through light direction control panel 4 and emerges in parallel rays from light direction control panel 4. The light from light direction control panel 4 is incident on second incident surface 78 of diffuser panel 7, and transmits through diffuser panel 7. Then, the diffuse light emerges from second light exit surface 79 of diffuser panel 7. In this manner, lighting apparatus 200 emits collimated and diffused light.

(Advantageous Effect)

Next, the advantageous effect of lighting apparatus 200 according to the present embodiment will be described.

As described above, lighting apparatus 200 according to the present embodiment further includes: light guide panel 210 disposed facing light direction control panel 4; and reflector 220 disposed facing light guide panel 210, reflector 220 reflecting light. Light source 30 causes light to enter light guide panel 210 through an edge surface. Light guide panel 210 causes the light to emerge from a surface facing light direction control panel 4.

With this configuration, incident light from light sources 230 on third incident surface 213 of light guide panel 210 emerges from front surface 211 of light guide panel 210 and then transmits through light direction control panel 4 and diffuser panel 7, thereby allowing collimated and diffused light to be emitted.

Moreover, light emitted from light emitting module 203 is caused to enter through third incident surface 213 which is the edge surface of light guide panel 210, and thus it is possible to downsize light emitting module 203. This prevents lighting apparatus 200 from being scaled up and increasing the manufacturing cost.

The present embodiment produces other advantageous effects in the same manner as Embodiment 1 etc.

Embodiment 3

(Configuration)

The configuration of lighting apparatus 300 according to Embodiment 3 will be described with reference to FIG. 7.

Figure 7:
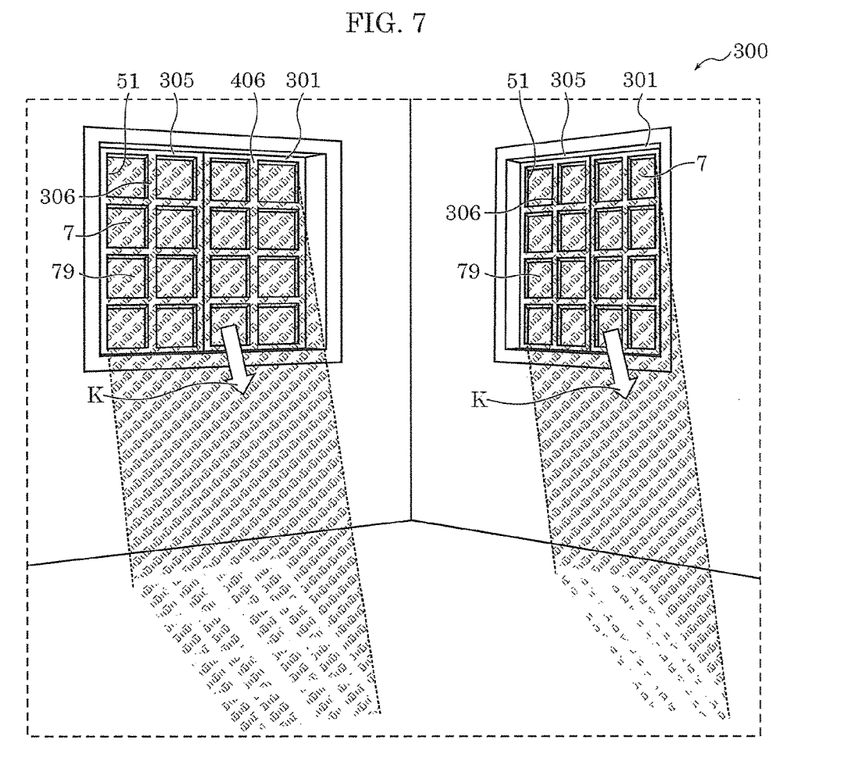
FIG. 7 is a schematic view illustrating a lighting system according to Embodiment 3.

FIG. 7 is a schematic view illustrating lighting system 300 according to Embodiment 3.

The present embodiment differs from Embodiment 1 in that two or more lighting apparatuses 301 are employed. Moreover, unless otherwise stated, lighting apparatus 301 according to the present embodiment is the same as lighting apparatus 1 according to Embodiment 1. Substantially the same structural components are assigned with the same reference signs, and redundant descriptions will be omitted or simplified.

As illustrated in FIG. 7, in the present embodiment, two lighting apparatuses 301 are disposed in a room. It should be noted that lighting system 300 according to the present embodiment includes two lighting apparatuses 301, but there may be three or more lighting apparatuses 301.

Frame 305 of lighting apparatus 301 has a shape mimicking a window frame. Light blocker 306 of frame 305 has a shape mimicking window mullions as well.

A primary direction J of light emitted from each of lighting apparatuses 1 is substantially parallel to one another. In the present embodiment, primary light direction K of lighting apparatus 301 installed in the left wall of the room is substantially parallel to primary light direction K of lighting apparatus 301 installed in the right wall of the room. For example, the projecting direction of micro louver 42 of light direction control panel 4 of lighting apparatus 301 installed in the right wall of the room may be substantially the same as the projecting direction of micro louver 42 of light direction control panel 4 of lighting apparatus 301 installed in the left wall of the room. Here, primary light direction K of lighting apparatus 301 refers to a direction of light emitted from lighting apparatus 301.

(Advantageous Effect)

Next, the advantageous effect of lighting system 300 including lighting apparatuses 301 according to the present embodiment will be described.

As described above, lighting system 300 according to the present embodiment includes two or more lighting apparatuses 301.

In this manner, while light emerges from second light exit surface 79 of diffuser panel 7, a portion of light passing through frame opening 51 of frame 305 is blocked. Thus, frame 305, light blocker 6, and the light passing through frame opening 51 cause a user to feel as if he/she looked at window frames.

Moreover, diffuse light emerges from second light exit surface 79 of diffuser panel 7, and thus the user is given a sense of natural light coming through windows. Accordingly, it is possible to produce a lighting environment which mimics a lighting environment by natural light coming through windows.

Moreover, in lighting system 300 according to the present embodiment, the primary direction of light emitted from each of lighting apparatuses 301 is substantially parallel to one another.

In this manner, the primary direction of light emitted from each of lighting apparatuses 301 is substantially parallel to one another, and thus a user feels as if natural light was coming through real windows. Accordingly, it is possible to produce a lighting environment closer to nature.

The present embodiment produces other advantageous effects in the same manner as Embodiment 1 etc.

OTHER VARIATIONS

Although the lighting apparatus according to the present disclosure has been described on the basis of Embodiments 1 to 3 and the variation of Embodiment 1, the present disclosure is not limited to the above-described Embodiments 1 to 3 and the variation of Embodiment 1.

Figure 8:
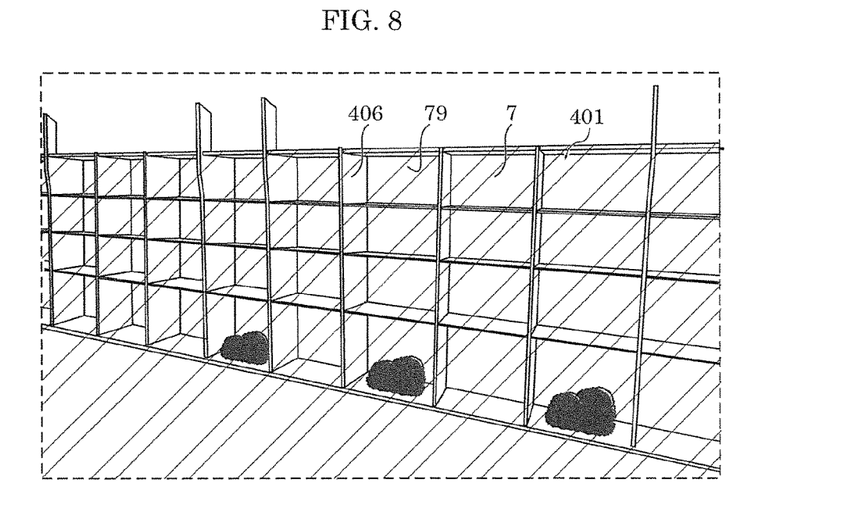
FIG. 8 is an image view illustrating a lighting apparatus according to a variation example.

For example, in the above-described Embodiments 1 to 3 and the variation of Embodiment 1, light blocker 406 may provide a shelf as illustrated in FIG. 8. FIG. 8 is an image view illustrating lighting apparatus 401 according to a variation example. Specifically, light blocker 406 projects from second light exit surface 79 of diffuser panel 7 such that small items such as vases and books can be placed on light blocker 406. In other words, light blocker 406 not only forms window mullions but also functions as a shelf.

In lighting apparatus 401, light blocker 406 provides a shelf. In this case, light blocker 406 projects from second light exit surface 79, and thus a user mainly focuses his/her eyes on light blocker 406. In this case, when the focus is put on the top of light blocker 406, diffuser panel 7 located behind light blocker 406 is slightly blurred. Accordingly, a user easily feels as if natural light was coming through real windows, and thus it is possible to produce a lighting environment which more realistically mimics a lighting environment by natural light coming through a window.

Figure 9:
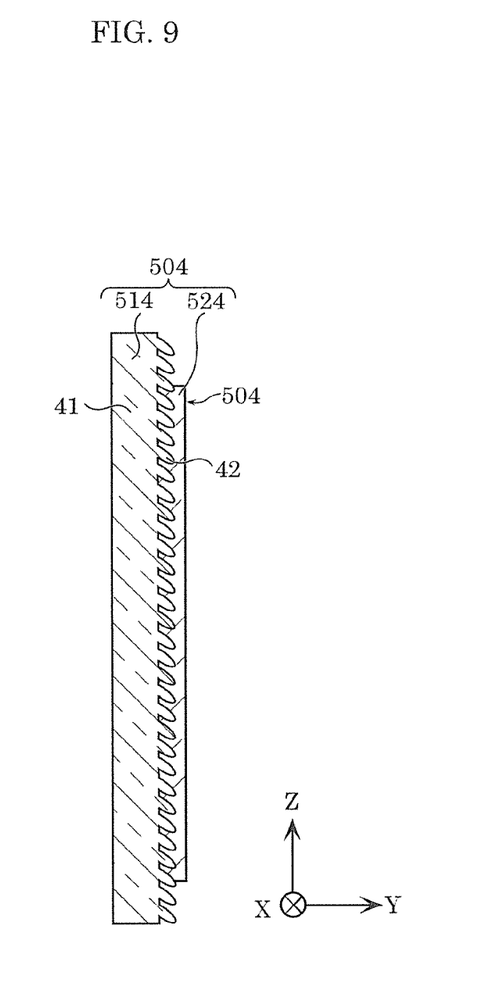
FIG. 9 is a cross-sectional view illustrating a light direction control panel of a lighting apparatus according to a variation example.

Moreover, in the above-described Embodiments 1 to 3 and the variation of Embodiment 1, light direction control panel 504 may include first light transmitting portion 514 and second light transmitting portion 524 as illustrated in FIG. 9. FIG. 9 is a cross-sectional view illustrating light direction control panel 504 of a lighting apparatus according to a variation example. As illustrated in FIG. 9, first light transmitting portion 514 includes base 41 and micro louvers 42. Second light transmitting portion 524 is layered on the y-axis plus side of first light transmitting portion 514. Second light transmitting portion 524 is layered on the central portion of the y-axis plus side of light direction control panel 504. In these cases, light direction control panel 504 functions as a lens due to the refraction gradient. It should be noted that second light transmitting portion 524 may be layered on the entire surface of light direction control panel 504.

Moreover, although the lighting apparatus according to Embodiment 1 to 3 and the variation of Embodiment 1 has a rectangular shape in a front view (when viewed from the front side), the shape is not limited to the rectangular shape. For example, a multangular shape such as a triangular shape, or a half-moon shape may be employed, or a combination of these shapes may be employed.

Moreover, in the above-described Embodiments 1 to 3 and the variation of Embodiment 1, the light blocker may be disposed on the second incident surface or the second light exit surface of the diffuser panel. Moreover, when the lighting apparatus includes two or more diffuser panels, the light blocker may separate the two adjacent diffuser panels.

Moreover, in Embodiment 2, the lower width of the frame of the lighting apparatus may be wider than the upper width of the frame of the lighting apparatus. The width of the frame on the z-axis plus side may be wide enough to cover the non-uniformity of brightness in a space between two adjacent light sources.

Moreover, in the variation of Embodiment 1, the first light transmitting portion may include the base and the micro louvers. The second light transmitting portion may fill a groove between two adjacent micro louvers. In this case, light transmitting though this optical corrector is easily reflected on the interface between the micro louver and the second light transmitting portion. Accordingly, it becomes easier to cause light to emerge in parallel rays from the optical corrector.

Moreover, in Embodiments 1 to 3 and the variation of Embodiment 1, although an operation component is electrically connected to the lighting apparatus, a remote controller which performs radio communications may operate the lighting apparatus (operation such as turning on or off of the power sources). The radio communications can be achieved by providing the lighting apparatus with a communicator which performs the radio communications with the remote controller. The communicator is, for example, a device having the near field communication function, such as ZigBee (registered trademark), Wi-Fi (registered trademark), and Bluetooth (registered trademark).

It should be noted that the present disclosure also includes other forms in which various modifications apparent to those skilled in the art are applied to Embodiments 1 to 3 and the variation of Embodiment 1 or forms in which structural components and functions in Embodiments 1 to 3 and the variation of Embodiment 1 are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus, comprising:
   a light source;
   a diffuser panel disposed to receive light emitted from the light source, the diffuser panel being light transmissive;
   a frame having an opening through which light passes;
   a light blocker that blocks the light emitted from the light source; and
   a light direction control panel disposed facing the diffuser panel and between the light source and the diffuser panel, the light direction control panel transmitting the light emitted from the light source and causing the light to emerge in parallel rays,
   wherein the diffuser panel is fixed to the frame to cover the opening, and the light blocker blocks a portion of the light passing through the opening.

2. The lighting apparatus according to claim 1, wherein the light direction control panel includes a base and a plurality of micro louvers formed on the base, and each of the plurality of micro louvers projects from the base in substantially a same direction.

3. The lighting apparatus according to claim 2, wherein each of the plurality of micro louvers projects in a direction crossing a primary light direction of the light source.

4. The lighting apparatus according to claim 1, wherein the light direction control panel includes a first light transmitting portion and a second light transmitting portion that is layered on a light exit side of the first light transmitting portion and has a refractive index lower than a refractive index of the first light transmitting portion, and the second light transmitting portion is thicker in a central portion of the light direction control panel than in a peripheral portion of the light direction control panel.

5. The lighting apparatus according to claim 1, further comprising:

a light guide panel disposed facing the light direction control panel, and a reflector disposed facing the light guide panel, the reflector reflecting light, wherein the light source causes light to enter the light guide panel through an edge surface, and the light guide panel causes the light to emerge from a surface facing the light direction control panel.

6. A lighting apparatus, comprising:

a light source;

a diffuser panel disposed to receive light emitted from the light source, the diffuser panel being light transmissive;

a frame having an opening through which light passes; and a light blocker that blocks the light emitted from the light source, wherein:

the diffuser panel is fixed to the frame to cover the opening, and scatters blue light more than light having a color other than blue, the blue light being included in the light emitted from the light source, and the light blocker blocks a portion of the light passing through the opening.

7. The lighting apparatus according to claim 1, wherein the light blocker is disposed on a light exit surface of the diffuser panel to project from the light exit surface of the diffuser panel.

8. The lighting apparatus according to claim 1, wherein the light blocker is provided on the frame to divide the opening into a plurality of sections.

9. The lighting apparatus according to claim 8, wherein the light blocker is formed in a grid.

10. A lighting apparatus, comprising:

a light source;

a diffuser panel disposed to receive light emitted from the light source, the diffuser panel being light transmissive;

a frame having an opening through which light passes; and a light blocker that blocks the light emitted from the light source, wherein:

the diffuser panel is fixed to the frame to cover the opening, and the light blocker blocks a portion of the light passing through the opening, and provides a shelf.

11. The lighting apparatus according to claim 1, further comprising:

a plurality of light sources each of which is the light source; and a light emitting module including the plurality of light sources and a wiring board on which the plurality of light sources are mounted in a matrix, wherein the light direction control panel and the light blocker are disposed on light emission sides of the plurality of light sources.

12. The lighting apparatus according to claim 4, wherein the second light transmitting portion is layered on a central portion of the first light transmitting portion.

13. A lighting system, comprising:

a plurality of the lighting apparatuses according to claim 1.

14. The lighting system according to claim 13, wherein primary directions of light emitted from the plurality of the lighting apparatuses are substantially parallel to one another.

* * * * *